US007493452B2

(12) United States Patent
Eichenberger et al.

(10) Patent No.: US 7,493,452 B2
(45) Date of Patent: Feb. 17, 2009

(54) METHOD TO EFFICIENTLY PREFETCH AND BATCH COMPILER-ASSISTED SOFTWARE CACHE ACCESSES

(75) Inventors: Alexandre E. Eichenberger, Chappaqua, NY (US); John Kevin Patrick O'Brien, South Salem, NY (US); Kathryn M. O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 11/465,522

(22) Filed: Aug. 18, 2006

(65) Prior Publication Data

US 2008/0046657 A1 Feb. 21, 2008

(51) Int. Cl.
 *G06F 12/00* (2006.01)
(52) U.S. Cl. ........................ 711/137; 711/133; 711/144; 711/206
(58) Field of Classification Search ................. 711/202, 711/206, 213, 133, 137, 143, 144; 712/237
See application file for complete search history.

(56) References Cited

U.S. PATENT DOCUMENTS

| 5,493,660 | A | * | 2/1996 | DeLano et al. | ............... 711/206 |
| 6,105,113 | A | * | 8/2000 | Schimmel | ................... 711/146 |
| 6,175,898 | B1 | * | 1/2001 | Ahmed et al. | ................ 711/137 |
| 7,003,630 | B1 | * | 2/2006 | Kissell | ........................ 711/141 |
| 2001/0032297 | A1 | * | 10/2001 | Morikawa et al. | ........... 711/133 |
| 2002/0069327 | A1 | * | 6/2002 | Chauvel | ..................... 711/130 |
| 2006/0112237 | A1 | * | 5/2006 | Chen et al. | ................... 711/144 |
| 2006/0123405 | A1 | * | 6/2006 | O'Brien et al. | .............. 717/150 |
| 2006/0155886 | A1 | * | 7/2006 | da Silva et al. | ................. 710/5 |
| 2007/0043929 | A1 | * | 2/2007 | Safford et al. | ............... 711/207 |
| 2007/0261042 | A1 | * | 11/2007 | Chen et al. | ................... 717/148 |
| 2007/0283098 | A1 | * | 12/2007 | O'Brien et al. | .............. 711/118 |

OTHER PUBLICATIONS

Grahn et al., "Relative Performance of Hardware and Software-Only Directory Protocols Under Latency Tolerating and Reducing Techniques", Proc. 11th Int'l Parallel Processing Symposium, Apr. 1997, http://citeseer.ist.psu.edu/article/grahn95relative/html, pp. 500-506.
Darnell et al., "Automatic Software Cache Conference through Vectorization", Proceedings of the ACM 1992 International Conference on Supercomputing, Washington, D.C., Jul. 1992, pp. 1-15.
U.S. Appl. No. 11/279,768, filed Apr. 14, 2006, Chen et al.

* cited by examiner

*Primary Examiner*—Hong Kim
(74) *Attorney, Agent, or Firm*—Stephen J. Walder, Jr.; Matthew B. Talpis (57) ABSTRACT

A method to efficiently pre-fetch and batch compiler-assisted software cache accesses is provided. The method reduces the overhead associated with software cache directory accesses. With the method, the local memory address of the cache line that stores the pre-fetched data is itself cached, such as in a register or well known location in local memory, so that a later data access does not need to perform address translation and software cache operations and can instead access the data directly from the software cache using the cached local memory address. This saves processor cycles that would otherwise be required to perform the address translation a second time when the data is to be used. Moreover, the system and method directly enable software cache accesses to be effectively decoupled from address translation in order to increase the overlap between computation and communication.

13 Claims, 9 Drawing Sheets

METHOD TO EFFICIENTLY PREFETCH AND BATCH COMPILER-ASSISTED SOFTWARE CACHE ACCESSES

GOVERNMENT CONTRACT

The invention set forth herein was developed under a contract with the United States government (National Security Agency Project H98230-04-C-0920). Thus, the United States government has rights to this patent application.

BACKGROUND

1. Technical Field

The present application relates generally to an improved data processing system and method. More specifically, the present application is directed to a system and method to efficiently prefetch and batch compiler-assisted software cache accesses.

2. Description of Related Art

Shared memory multiprocessor systems are typically composed of a plurality of processors and one or more memories, e.g., a global memory or memories, which are linked by an interconnection bus or network. In such shared memory multiprocessor systems, because memory accesses must go through this interconnection bus or network, memory access latency is introduced into the system. Such memory access latency becomes important to the performance of the multiprocessor system.

Various approaches have been attempted to minimize this access latency. Such approaches generally involve multi-threading techniques and caching techniques.

With particular importance to the present invention, when using caching in a multiprocessor system, the need to maintain cache coherence is an important consideration. That is, in order to avoid changing the semantics of a program execution through the use of caches, the memory must retain the appearance of sequential consistency. Most approaches to this cache coherence problem have focused on hardware mechanisms to maintain coherence. However, the overhead of maintaining coherence in hardware can be high and scaling systems based on hardware coherence can be a difficult problem.

An alternative to hardware-based solutions for coherence is to use compilers to analyze programs and automatically augment them with calls to coherence operations, e.g., updates and invalidates, where necessary. Compiler based coherence techniques require only minimal support, or even no support, from cache hardware. The hardware need only provide a mechanism to enable software control of the cache. Such compiler based coherence techniques that make use of software control of caches are typically referred to as "software caches." The "software cache" essentially provides a structure that enables a machine with long latency access to a shared memory, e.g., a global memory, to cache frequently accessed data in a local, software controlled store/scratch memory. More information regarding cache coherence and software cache coherence mechanisms may be found in Darnell et al., "Automatic Software Cache Coherence through Vectorization," Proceeding of the 1992 International Conference on Supercomputing.

According to typical directory-based cache coherence protocols, when a lookup operation for a portion of data results in the portion of data being located in the software cache, the result is a software cache "hit." When a lookup operation for a portion of data results in the portion of data not being located in the software cache, the result is a software cache "miss." A typical software cache "hit" access consists essentially of first locating the cache directory data associated with a global address of the data that is requested. The software cache directory is a data structure, used in directory based cache coherence protocols, that tracks where each "page," or block of memory, has been cached. The global address may be used with a software cache directory to identify where the page of memory containing the requested data is stored.

After locating the storage location of the page of memory containing the requested data using the cache directory and the global address of the data that is requested, the software cache directory data is accessed and checked for a software cache "hit." If there is a software cache "hit," meaning that the data corresponding to the global address is present in the software cache, the data in the cache line associated with the software cache "hit" is accessed to thereby deliver the data to the requesting application.

When accessing the software cache directory data results in a software cache "miss," i.e. the requested data for the global address is not present in the software cache, a miss handler is invoked. The miss handler is a software routine that operates to retrieve the requested data from another cache, the shared or global memory, or even physical storage such as a hard disk, in the event that the data is not present in the software cache.

The cache miss handler typically, after being invoked, will find a cache line of the software cache to evict and will write any dirty data, i.e. data that has been modified, in the evicted cache line to memory or physical storage, such as by way of a direct memory access (DMA) operation or by way of a series of explicit memory copy instructions. The new cache line may then be obtained and written into the software cache. The DMA operation and the writing in, such as by way of a DMA operation, of the new cache line may be performed in a substantially parallel manner if an additional temporary cache line is used with appropriate bookkeeping being performed in the software cache directory. Appropriate synchronization mechanisms need to be used between writing the new cache line to the software cache and allowing the data in this new cache line to be accessed and delivered to the requesting application so that the data being cached is not used prior to the data being stored in the software cache.

It can be seen that when a software cache "miss" occurs, a large latency may be experienced while the miss handler performs the necessary operations for evicting a cache line, writing dirty data to another storage, locating a new cache line to load into the software cache, and actually loading that cache line into the software cache. With hardware caches, such latency can be somewhat hidden by scheduling a hardware data pre-fetch instruction early enough ahead of the actual use of the data. That is, the hardware may pre-fetch data into the hardware cache in anticipation of the data being used at a later time and thereby decrease the number of cache "misses" encountered. Various hardware based pre-fetching mechanisms are generally known in the art.

If a straightforward analogy of the hardware pre-fetching mechanisms is made with software caching, the result is that there are two software cache directory accesses performed, one for the pre-fetching and one for the actual data access. This overhead may be small in hardware, however, it is very significant for software caches where the software cache directory access is typically in the order of tens of instructions with a total latency in the order of tens of processor cycles.

SUMMARY

In view of the above, it would be beneficial to have a mechanism that allows pre-fetching of data in a software cache based system that reduces the overhead of software cache directory accesses. The illustrative embodiments set forth herein provide a system and method to efficiently pre-fetch and batch compiler-assisted software cache accesses. The illustrative embodiments reduce the overhead associated with software cache directory accesses and thereby, increase the performance of the computing system in which the illustrative embodiments are employed.

The illustrative embodiments operate based on the realization that the pre-fetching instruction is essentially an attempted access of a data value in the software cache. Thus, in performing the pre-fetching of the data value, the pre-fetch instruction causes a software cache directory access to be performed, which involves address translation from a global memory address space to a local memory address space, causes a determination to be made as to whether a hit or miss occurs, and causes execution of miss handling when needed. Thus, when it is time to utilize the pre-fetched data value, it is not necessary to repeat these operations as long as the results of these operations may be stored such that they are retrievable.

With the illustrative embodiments, the local memory address of the cache line that stores the pre-fetched data is itself cached, such as in a register or well known location in local memory, so that the later data access does not need to perform these operations and can instead access the data directly from the software cache using the cached local memory address. That is, during the pre-fetching of the data value, as part of the software cache directory access, a global address for the data value is translated into a local memory address and stored in a known location of the local memory or a register associated with the processor. Since the local memory address for the cache line for this translation is stored in a well known location or register, the translation need not be performed again with a subsequent access of the data and instead, the result may simply be read from the register or well known location. This saves processor cycles that would otherwise be required to perform the address translation a second time.

Possibly even more importantly than the above saving of cycles, the illustrative embodiments, in which the address of the cache line storing the pre-fetched data is stored for easy access, directly enable software cache accesses to be effectively decoupled from address translation in order to increase the overlap between computation and communication. This can be done with low overhead, a necessity as otherwise the additional work done to do the pre-fetching may actually degrade overall performance since, in known pre-fetching mechanisms, the overhead of the pre-fetching occurs regardless of a software cache hit or miss but the decoupling benefit only is realized when a software cache miss occurs. Moreover, using the mechanisms of the illustrative embodiments, as will be described hereafter, one can batch several software cache requests together, for example, or overlap software cache accesses (for future computations) with computations (for pre-loaded data).

In one illustrative embodiment, a method is provided for accessing data. The method may comprise receiving a global address for the data, determining if a local address corresponding to the global address is present in a cache local address plus offset (CLAPO) storage device, and retrieving the local address from the CLAPO storage device if the local address is present in the CLAPO storage. The method may further comprise performing a software cache hit check operation to obtain the local address, if the local address corresponding to the global address is not present in the CLAPO storage device and accessing the data in a software cache data structure using the local address. The global address is in a global address space of a global storage device associated with the data processing system. The local address is in a local address space of a local memory associated with a processor of the data processing system.

The CLAPO storage device may be a register associated with the processor or a known location in the local memory associated with the processor. The method may be implemented using a software cache management engine inserted, by a compiler, into compiled code that is executed by the data processing system.

The method may be performed in response to execution of a pre-fetch instruction by the processor. The pre-fetch instruction may be inserted, by a compiler, into compiled code executed by the processor. Performing the software cache hit check operation to obtain the local address, may comprise attempting to translate the global address into the local address using a software cache directory data structure. A determination may be made as to whether the translation is successful. The local address may be stored in the CLAPO storage device if the translation is successful. Performing the software cache hit check operation may further comprise determining if the global address matches an evicted dirty cache line and stalling accessing of the data by the processor until eviction of the dirty cache line is completed if the global address matches an evicted dirty cache line.

Moreover, performing the software cache hit check operation may further comprise performing cache miss handling if the translation is unsuccessful. Performing cache miss handling may comprise selecting a software cache line to evict, storing a local address corresponding to the selected cache line in the CLAPO storage device, and initiating a transfer of the data from the global storage device to the software cache data structure in the local storage device. Performing cache miss handling may further comprise determining if the software cache line to evict is dirty and determining if there is a pending eviction of the software cache line if the software cache line is dirty. If there is a pending eviction of the software cache line, the cache miss handling operation may wait for the pending eviction of the software cache line to complete.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
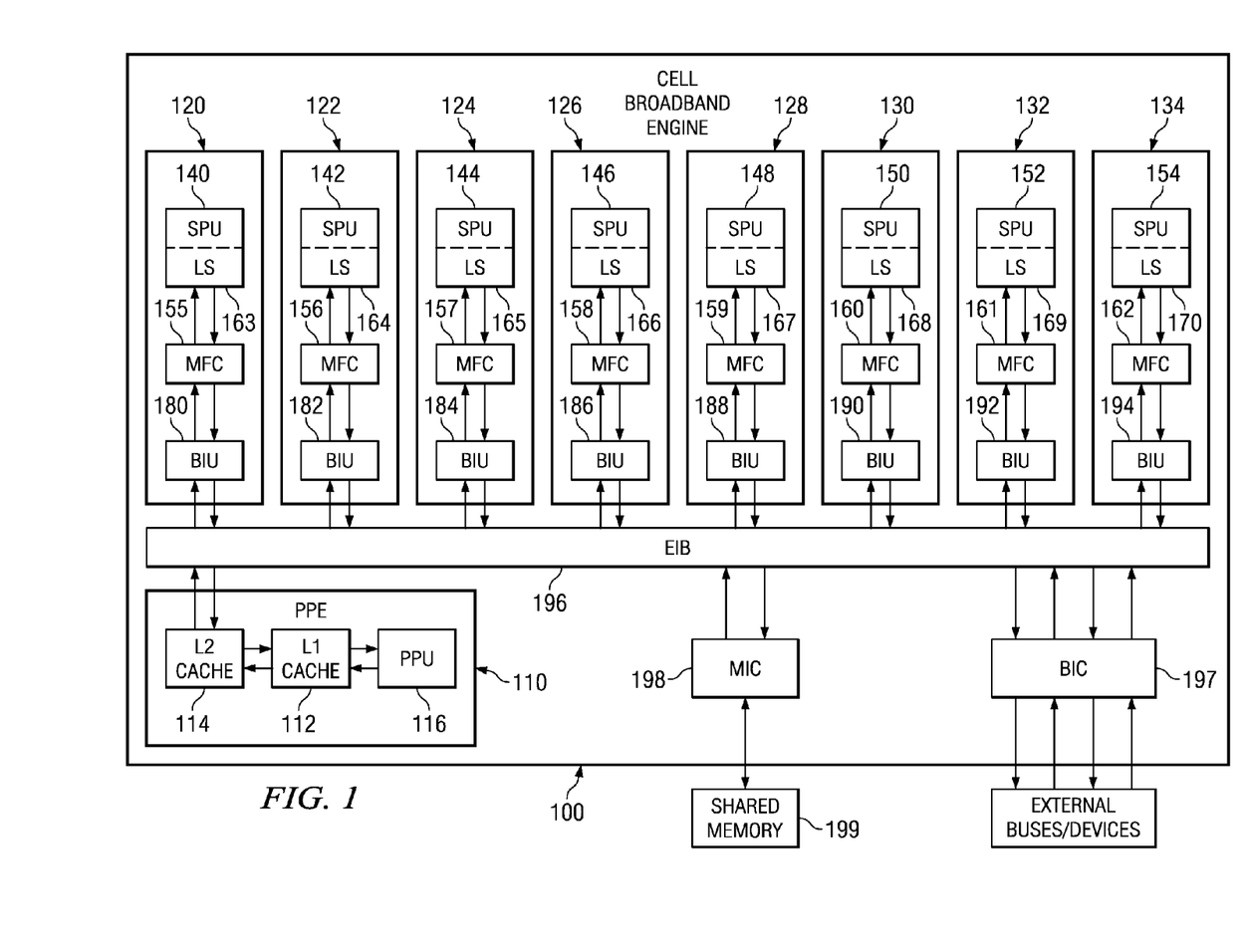
FIG. 1 is an exemplary block diagram of a data processing device in which aspects of the illustrative embodiments may be implemented.

The illustrative embodiments provide mechanisms for pre-fetching of data and batching of compiler-assisted software cache accesses in a software cache based system such that the overhead of software cache directory accesses is reduced. As such, the illustrative embodiments may be implemented in any data processing environment in which software caching is performed. FIG. 1 hereafter is provided as one exemplary data processing environment in which the mechanisms of the illustrative embodiments may be implemented. FIG. 1 is only exemplary and is not intended to state or imply any limitation with regard to the types or configurations of the data processing systems in which the mechanisms of the illustrative embodiments may be implemented. Many modifications to the data processing environment illustrated in FIG. 1 may be made without departing from the spirit and scope of the present invention.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in the CBE 100. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the CBE architecture described above as an exemplary data processing environment, the illustrative embodiments make use of a compiler, which may be executed on the PPE 110, for example, or another platform, to compile source code for execution on the PPE 110 and, optionally, one or more of the SPEs 120-134. As part of the compilation of the source code, the compiler identifies data variables that are explicitly pre-fetchable and data variables that are not. For those data variables that are explicitly pre-fetchable, instructions may be inserted into the compiled code, upstream of the actual use of the data variables, to fetch the data for the variable.

Such identification of pre-fetchable data variables and insertion of pre-fetching instructions may be performed in any known manner. For example, the identification of pre-fetchable data variables and the insertion of fetch instructions into compiled code may be performed in a manner similar to that described in commonly assigned, and co-pending, U.S. patent application Ser. No. 11/279,768, entitled "Compiler Implemented Software Cache Apparatus and Method in which Non-Aliased Explicitly Fetched Data are Excluded," filed Apr. 14, 2006, currently pending, which is hereby incorporated by reference. Of course other mechanisms for pre-loading a software cache by pre-fetching data may be used without departing from the spirit and scope of the present invention.

Such identification of pre-fetchable data variables and insertion of pre-fetching instructions may be performed in any known manner. For example, the identification of pre-fetchable data variables and the insertion of fetch instructions into compiled code may be performed in a manner similar to that described in commonly assigned, and co-pending, U.S. patent application Ser. No. 11/279,768, entitled "Compiler Implemented Software Cache Apparatus and Method in which Non-Aliased Explicitly Fetched Data are Excluded," filed Apr. 14, 2006, currently pending, which is hereby incorporated by reference. Of course other mechanisms for pre-loading a software cache by pre-fetching data may be used without departing from the spirit and scope of the present invention.

In the CBE architecture, the resulting compiled code is partitioned for execution on the PPE 110 and SPEs 120-134. At runtime, the master thread resides on the PPE 110 and threads on the SPEs 120-134 are forked when needed. It should be kept in mind that while the illustrative embodiments are being described with reference to the CBE architecture, the illustrative embodiments are not limited to such an architecture. Thus, whether or not compilation is performed by the PPE 110, threads are forked on the SPEs 120-134, etc. is not intended to be limiting with regard to the inventive features of the illustrative embodiments.

In one illustrative embodiment, the SPEs 120-134 make use of software caches and pre-fetching to access data stored in the main system memory, i.e. the shared or global memory, associated with the PPE 110. It should be appreciated that the same mechanisms of the illustrative embodiments may be utilized in implementations where, rather than a centralized main system memory is accessed, a distributed memory is accessed via the software cache. Both the use of the software cache and the pre-fetching help to increase data access speed, reduce software cache misses, and otherwise increase the performance of the system in which the illustrative embodiments are employed.

With the CBE architecture of FIG. 1, the local stores 163-170 of the SPEs 120-134 have limited resources, e.g., storage capacity, and many different types of data/instructions that are competing for the local store resources. For example, code to be executed by the SPE is partitioned for execution by the SPEs and is pulled into the SPEs' local stores 163-170 as needed. Moreover, the compiler may stage data with regular accesses in and out of the local stores 163-170 of the SPEs 120-134 using static buffering. Furthermore, data with irregular accesses, which does not reside permanently in the SPE's local store 163-170 but rather in the main system memory, e.g., shared memory 199, is pulled into and out of the local store 163-170 of the SPE 120-134 as needed.

Software caching and pre-fetching is especially useful with regard to data with irregular accesses (irregular data), e.g., runtime pointers, which may be pulled into and out of the local stores 163-170 of the SPEs 120-134 via the software caching and pre-fetching mechanisms. For example, when irregular data is accessed, the data is typically referenced by the instructions running on the SPEs using a global address, e.g., an address in the address space of the shared memory 199, which must be translated into a local store address in the address space of the local store. The software cache of the local store then utilizes this local store address to perform a cache lookup to determine if the requested data is present in the software cache maintained in the local store. If not, i.e. a software cache miss occurs, the data must be pulled into the software cache from the global memory, e.g., shared memory 199, via a cache miss handler, so that the instructions executing on the SPE may utilize the requested data.

It should be appreciated that such software caching operations may be performed with any data/instructions and is not limited to data with irregular accesses. Moreover, it should be appreciated that software caching operations are not limited to operations performed with the external shared memory 199 as illustrated in FIG. 1. To the contrary, data may originate from any memory that is addressable by one or more of the processing elements involved in the computations. For example, in the CBE 100 illustrated in FIG. 1, the local stores 163-170 may be configured to be accessible by any of the SPUs 140-154. Thus, when this is the case, the local stores 163-170 may also be construed as globally accessible shared memory.

In order to minimize the number of cache misses encountered, pre-fetching may be utilized such that the data that is expected to be needed by instructions executing on the SPE is fetched into the software cache prior to the execution of the instruction that needs the data. Typically, with such pre-fetching, a global address of the data is translated into a local store address and a determination is made based on the local store address as to whether the requested data is present in the software cache of the local store. Cache miss handling is performed if the data is not present in the software cache of the local store. This pre-fetches the data into the software cache if the data is not already present in the software cache. However, at the later time when the data is actually required by an executing instruction, the same operations must still be performed, i.e. the address translation, determination, and cache miss handling. The pre-fetching simply reduces the likelihood that a cache miss will occur when the data is actually needed and thereby increases the speed of execution of the instructions. However, the pre-fetching introduces additional overhead in having to perform some operations, e.g., address translation, software cache lookup, and the like, twice.

The illustrative embodiments operate to reduce the overhead associated with pre-fetching of data. The illustrative embodiments operate based on the realization that the pre-fetching instruction is essentially an attempted access of a data value in the software cache. Thus, in performing the pre-fetching of the data value, the pre-fetch instruction causes a software cache directory access to be performed, which involves address translation from a global memory address space to a local memory address space, causes a determination to be made as to whether a hit or miss occurs, and causes execution of miss handling when needed. Thus, when it is time to utilize the pre-fetched data value, it is not necessary to repeat these operations as long as the results of these operations may be stored such that they are retrievable.

With the illustrative embodiments, the local memory address of the cache line that stores the pre-fetched data is itself cached, such as in a register or well known location in local memory, so that the later data access does not need to perform these operations and can instead access the data directly from the software cache using the local memory address in the register or well known location. That is, during the pre-fetching of the data value, as part of the software cache directory access, a global address for the data value is translated into a local memory address and stored in a known location of the local memory or a register associated with the processor. Since the local memory address for the cache line for this translation is stored in a well known location or register, the translation need not be performed again with a subsequent access of the data and instead, the result may simply be read from the register or well known location. This saves processor cycles that would otherwise be required to perform the address translation a second time.

Possibly even more importantly than the above saving of cycles, the illustrative embodiments, in which the address of the cache line storing the pre-fetched data is stored for easy access, directly enable software cache accesses to be effectively decoupled from address translation in order to increase the overlap between computation and communication. This can be done with low overhead, a necessity as otherwise the additional work done to do the pre-fetching may actually degrade overall performance since, in known pre-fetching mechanisms, the overhead of the pre-fetching occurs regardless of a software cache hit or miss but the decoupling benefit only is realized when a software cache miss occurs. Moreover, using the mechanisms of the illustrative embodiments, as will be described hereafter, one can batch several software cache requests together, for example, or overlap software cache accesses (for future computations) with computations (for pre-loaded data).

Figure 2:
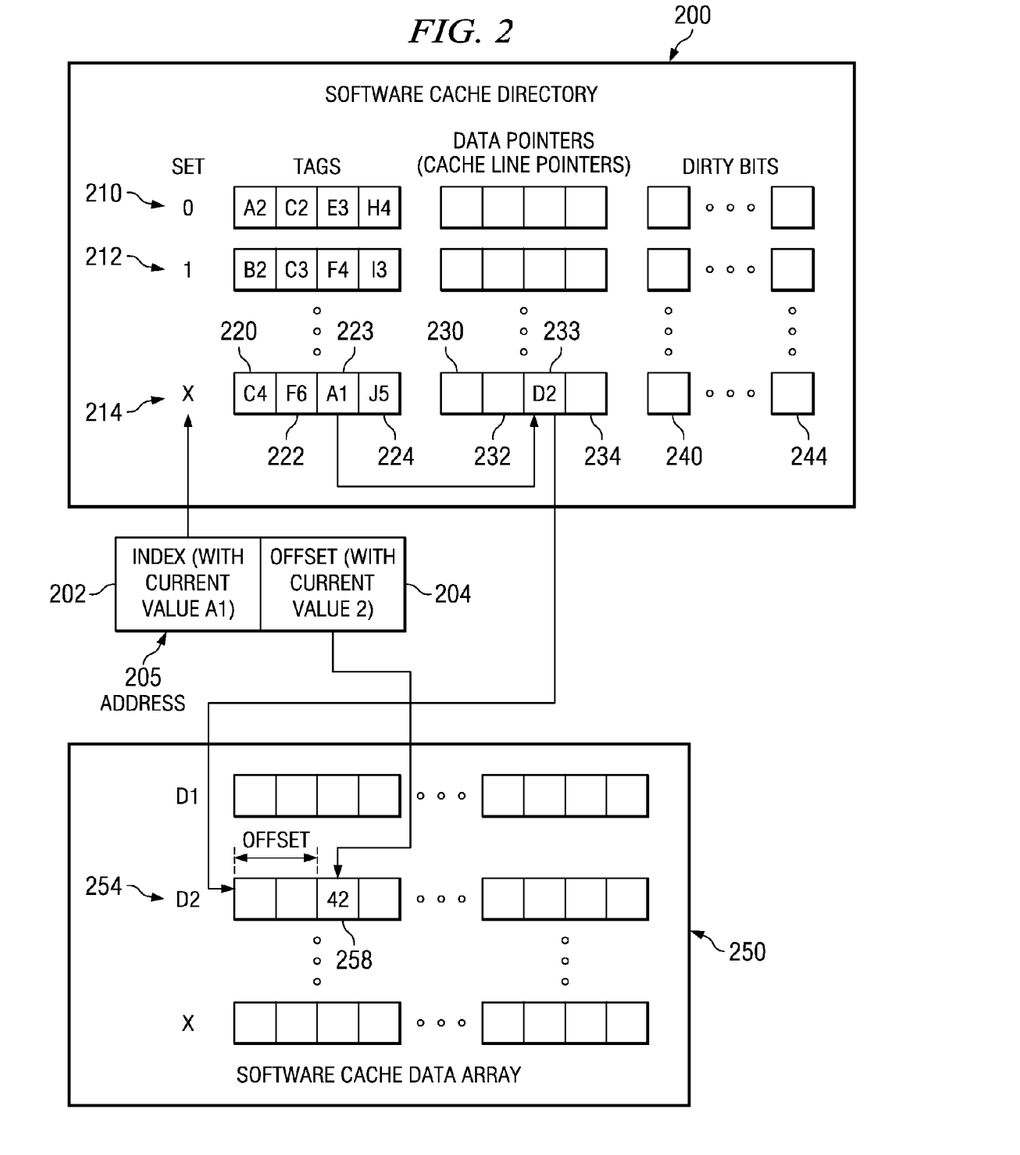
FIG. 2 is an exemplary diagram illustrating a software cache architecture which may be utilized with data processing system that implements software caching, such as the CBE architecture of FIG. 1.

FIG. 2 illustrates a software cache architecture which may be utilized with a data processing system that implements software caching, such as the CBE architecture of FIG. 1. In FIG. 2, the manner by which a global address space address 205 is translated into a local address in the specific case of a software cache hit is illustrated. Without loss of generality, the global address 205, in one illustrative embodiment, consists of two subfields, the index and the offset, respectively illustrated in FIG. 2 as 202 and 204. Without loss of generality, the software cache architecture shown in FIG. 2 utilizes a 128-set, 4-way associative software cache directory structure that stores pointers to data lines of a software cache data array 250 in the local store. That is, the software cache directory 200 includes 128 sets 210-214, with a set being comprised of 4 tags 220-224, 4 data pointers 230-234, one or more dirty bits 240-244, and possibly additional information. The 4 tags of each set, e.g., tags 220 of set 210, are used to identify a particular set and a particular data pointer within the set.

The index 202 of a given address 205 is mapped to a tag in a corresponding set 210-214 of the software cache 200. It should be noted that the given address 205 in the depicted example is a global address and that the specific goal of the software cache is to translate this global address into a local address in the local store, private memory, or scratch pad memory associated with the processor doing the request for the data.

The particular index 202 of interest, e.g., index "a1," in the address 205, is used to identify a particular data pointer, e.g., data pointer "d2," in the corresponding set, e.g., set 214. For example, if the index "a1" in the address 205 matches the tag "a1" in the third position of the 4-way associative set entry of the software cache directory structure 200, namely 223, then the data pointer currently containing the value "d2" that is in the third position of the data pointers, namely 233, is retrieved as the corresponding data pointer. The data pointer points to a particular line, e.g., data line 254, in the software cache data array 250. The offset 204 in the original given address 205 is used to provide an offset into the data line to thereby identify a portion of data, e.g., data block 258, corresponding to the given global address 205.

Figure 3:
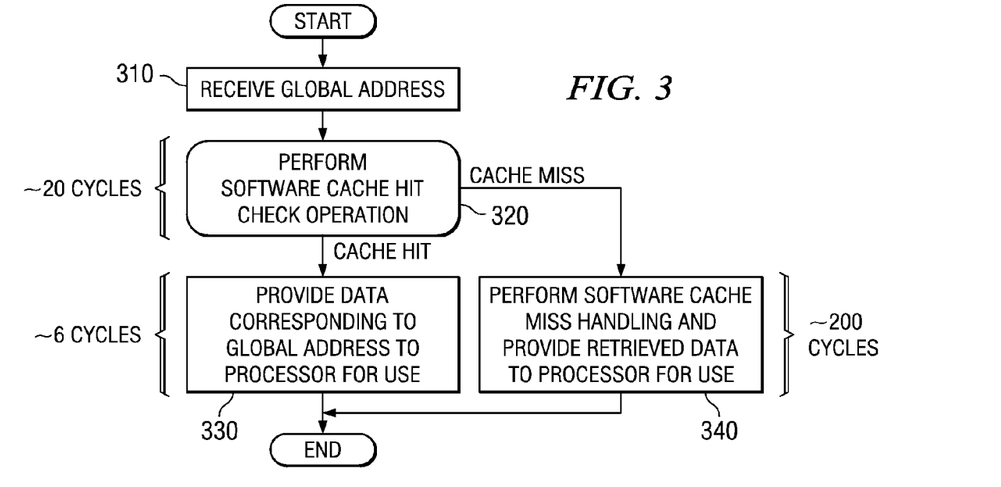
FIG. 3 is a flowchart outlining the basic operation for performing a software cache access.

FIG. 3 is a flowchart outlining the basic operation for performing a software cache access. As shown in FIG. 3, the operation starts by receiving, in the software caching mechanism, an address provided in a global address space (step 310). A hit check operation is then performed by the software caching mechanism (step 320). This hit check operation may include translating the global address space address to a local store address space address and then performing the lookup operation described previously with regard to FIG. 2. This hit check operation may take approximately 20 processor cycles to complete, for example.

The result of the hit check operation is a determination as to whether the requested data corresponding to the global address is present in the software cache, i.e. whether a software cache hit has occurred or a software cache miss has occurred. If a software cache hit has occurred, the data corresponding to the global address may be obtained from the software cache and provided to the processor for use by the executing instructions (step 330). This operation may take approximately 6 processor cycles to complete.

If a software cache hit has not occurred, i.e. a software cache miss occurs, then the operation performs miss handling (step 340) by having the software caching mechanism call a software cache miss handler. The software cache miss handler may perform a number of operations including selecting a software cache line to evict from the software cache, copying back to the system or global memory any "dirty" data, loading the new cache line, waiting for completion of the loading of the new cache line, and returning the requested data to the processor for use by the executing instructions. Most of these operations will typically be done sequentially and may require approximately 200 or more processor cycles to complete.

Thus, from FIG. 3 it can be seen that by pre-fetching data to avoid or minimize software cache misses, approximately 200 processor cycles may be saved for each software cache miss that is avoided. However, in known pre-fetching mechanisms, the operations shown in FIG. 3 are performed when the pre-fetching instruction is executed and steps 310-330 are typically repeated when the data is actually requested by the instruction that requires the data. Thus, only the software cache miss handling processor cycles are saved by pre-fetching at the time that the instruction is executed. It can also be seen that additional processor cycles may be saved if it is possible to reduce the number of software cache hit checks that need to be performed, e.g., approximately 20 processor cycles for each hit check that is avoided. The illustrative embodiments provide a mechanism for avoiding duplicative hit checks, i.e. performing the hit check during pre-fetching and again when the data is to be used by an executing instruction.

Figure 4:
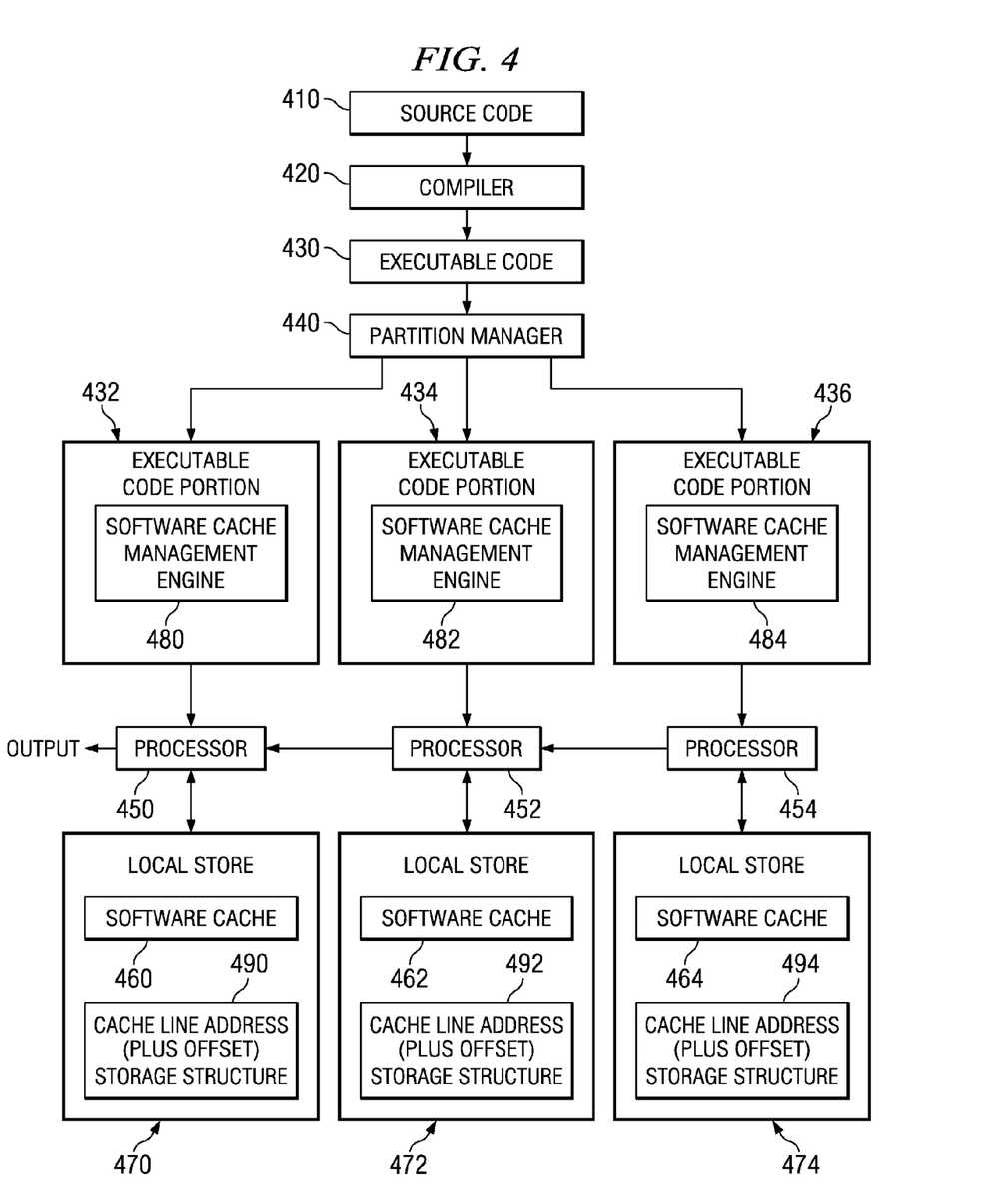
FIG. 4 is an exemplary diagram illustrating the primary operational components of a software caching mechanism in accordance with one illustrative embodiment.

FIG. 4 is an exemplary diagram illustrating the primary operational components of a software caching mechanism in accordance with one illustrative embodiment. As shown in FIG. 4, source code 410 is provided to a compiler 420 which compiles the source code 410 into an executable code 430. As part of the compilation, the compiler 420 may insert pre-fetch instructions into the executable code 430 for those data variables in the source code 410 that are determined to be pre-fetchable in accordance with predetermined criteria. Thus, the executable code 430 may include pre-fetch instructions which retrieve data for data variables prior to that data being required by a subsequently executed instruction.

The compiler 420 may further insert software cache management engine 480-484 functionality into the compiled code 430. These software cache management engines 480-484 manage the software caches 460-464 in accordance with the mechanisms of the illustrative embodiments, as described hereafter.

The executable code 430 is partitioned by a partition manager 440 and portions 432-436 of the executable code 430 are provided to various processors 450-454 of the multiprocessor system. The processors 450-454 execute their portion 432-436 of the executable code and utilize a software cache 460-464 in their associated local stores 470-474 to provide efficient access to the data required by their portion 432-436 of the executable code 430.

As mentioned previously, with the mechanisms of the illustrative embodiments, pre-fetch instructions are handled by the software cache management engine 480-484 such that the resulting translation of the global address to a local store address, and subsequently to an address of the cache line, is itself cached for quick retrieval without having to perform a software cache directory lookup operation. The storage of the address of the cache line, e.g., the data pointer, to the local memory storage 460-464 (and more specifically 250 in FIG. 2, for example), utilizes a cache line address storage structure 490-494 which is associated with the processor 450-454.

As stated above, the cache line address storage structure 490-494 stores the local address of the data corresponding to the global address. This local address may be represented, for example, as a cache line address (CLA), e.g., element 254 of FIG. 2, plus an offset, e.g., offset 204 in FIG. 2, which together identifies element 258 in FIG. 2. This CLA plus offset (CLAPO) corresponds to the local address that currently holds the data associated with the global address.

In a preferred embodiment, as depicted, the cache line address storage structure 490-494 is part of the local store 470-474, however this is not required. To the contrary, in another illustrative embodiment, registers outside of the local store 470-474 may be utilized for storing the cache line address corresponding to a tag of a global address of a pre-fetch instruction.

The cache line address storage structure 490-494 for a particular software cache access operation, in one illustrative embodiment, may be a dedicated register or even the original global address register used to store the global address of the software cache access operation, for example.

For example, the cache line address, e.g., the data pointer retrieved from the software cache directory, may be stored by the software cache management engine 480-484 in the same register that is initially used to provide to the software cache management engine 480-484 the global address to be translated (e.g., 205 in FIG. 2). Since both the generation of the code performing the cache hit check operation (e.g., 320 in FIG. 3) and the allocation of registers are fully under compiler control, those skilled in the art of compilers will recognize that it is relatively straightforward for the compiler to reuse the register initially containing the global address to store the translated address generated by the software cache management engine.

When the global address is again used, such as by way of execution of the portion 432-436 of the executable code 430, to access the data in the software cache, the translation of the global address to a local address and then the lookup of the cache line address in the software cache directory may be avoided by simply accessing the register corresponding to the global address. The above process for caching the result of an address translation may be done for each load and pre-fetch instruction in the executable code 430.

In other illustrative embodiments, the cache line address storage structure 490-494 may be a data structure maintained in the local store 470-474, such as a well known location in the local store 470-474, a first-in-first-out (FIFO) data structure maintained in the local store, or the like. Thus, as cache line address translations are performed by load and pre-fetch instructions, the resulting cache line addresses are stored either in a data structure stored in a well known location of the local store and associated with the tags of the original global addresses or are simply added to a FIFO data structure which, when an instruction that actually accesses a data value is executed, the next entry in the FIFO data structure is read from the FIFO data structure in accordance with a first-in-first-out scheme.

The storage of the cache line address in a cache line address storage structure 490-494 allows the software cache hit check operation and software cache miss handling operation to be desynchronized or decoupled from the actual accessing or use of the data. Thus, it is not necessary that such operations be performed with each attempted access of the data. This decoupling is illustrated in FIG. 5.

Figure 5:
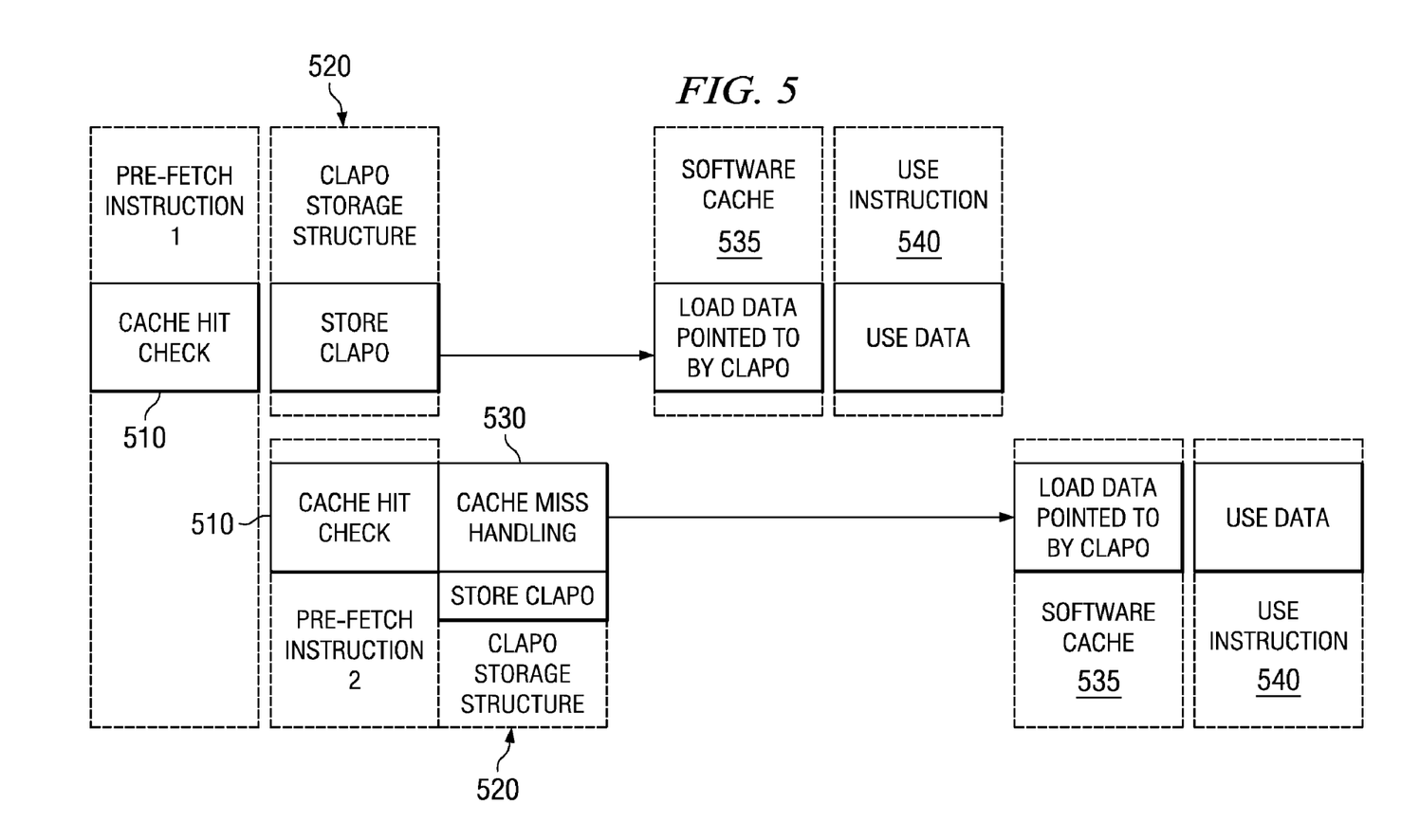
FIG. 5 is an exemplary diagram illustrating the decoupling of software cache access and miss handling from data use in accordance with one illustrative embodiment.

As shown in FIG. 5, during execution of a pre-fetch instruction, a software cache hit check 510 is performed. This software cache hit check 510 may result in either a hit being detected or a software cache miss being detected. As shown in FIG. 5, when a software cache hit is detected, such as with pre-fetch instruction 1, the cache line address plus offset (CLAPO) retrieved as part of the software cache hit check operation is stored in a CLAPO storage structure 520, e.g., a register or data structure in the local store. The CLAPO may be retrieved during, or just after, the check 510 is performed. Thereafter, the CLAPO in the CLAPO storage structure 520 may be used by an instruction specifying the global address to access the data in the software cache. That is, the data pointed to by the CLAPO may be loaded from the software cache 535 and the data may be used by a use instruction 540, as illustrated in FIG. 5.

If a software cache miss is detected, such as with pre-fetch instruction 2, the software cache miss handler is invoked to perform a software cache miss handling operation 530 which results in a cache line being selected for removal so that the new data may be stored in the software cache and a direct memory access (DMA) transfer operation for storing the new data may be initiated. During this initial step, the cache line where the requested data will arrive as the DMA transfer operation proceeds is uniquely determined and the CLAPO is set in CLAPO storage structure 520. Such operations may be performed in parallel, as depicted in FIG. 5 by the cache miss handling 530 and storage of the CLAPO in the CLAPO storage structure 520 being illustrated as being performed at substantially a same time.

The DMA transfer operation fills in the data in the selected cache line of the software cache 535 and, when the DMA transfer operation is complete, the data pointed to by the CLAPO is valid. The software cache directory is updated, after the DMA transfer is complete, with the cache line pointer information, e.g., data pointer, for the new cache line.

Thereafter, when an instruction 540 is executed that uses the data previously fetched, referred to herein as a "use" instruction, rather than performing the software cache hit check operation and potentially performing cache miss handling, the CLAPO storage structure 520 is first checked for the CLAPO. The cache line address may then be retrieved from the CLAPO storage structure 520 and used to retrieve the data from the software cache 535. Thus, the accessing and use of the data are closely linked and are separate from the software cache hit check and software cache miss handling operations, as depicted in FIG. 5.

Figure 6A:
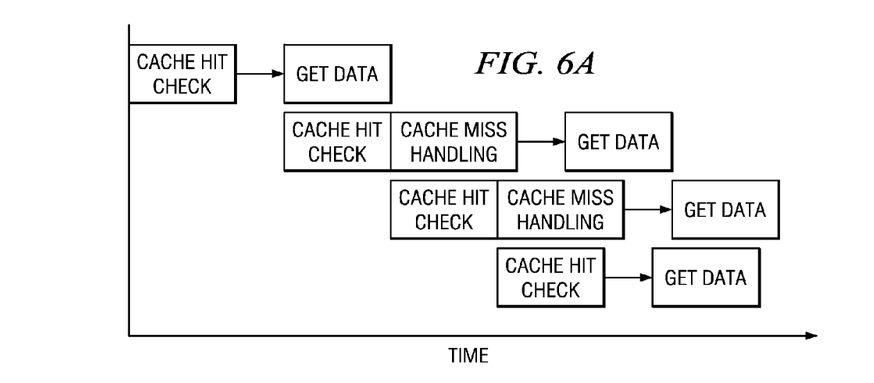
FIG. 6A is an exemplary diagram illustrating concurrently performing a plurality of software cache hit check and software cache miss handling operations in an overlapping manner in accordance with one illustrative embodiment.
Figure 6B:
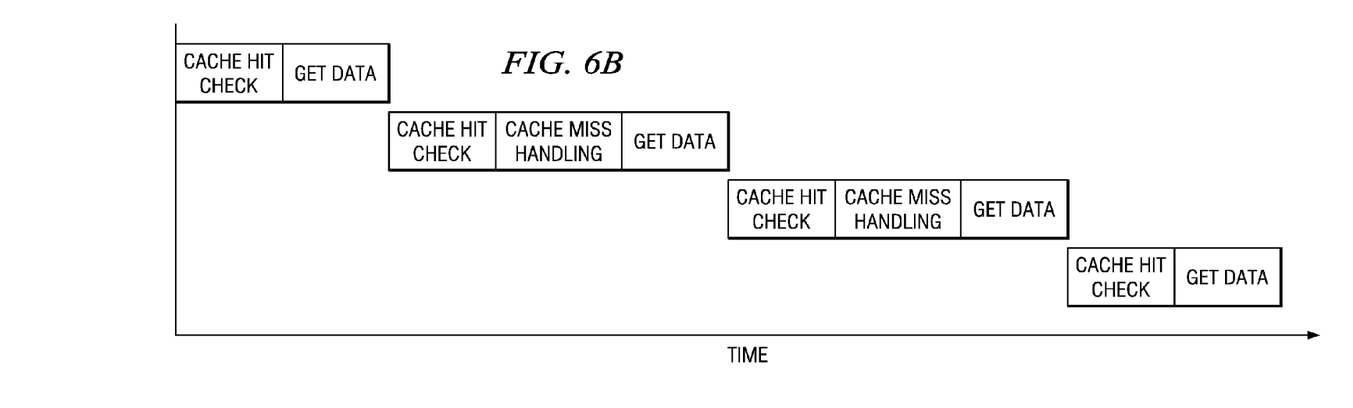
FIG. 6B is an exemplary diagram illustrating sequential performance of software cache hit check and software cache miss handling operations as is generally known.

With the illustrative embodiments, software cache accesses may be batched since the software cache accesses and software cache miss handling are decoupled from the actual use of the data. Hence, a plurality of software cache hit check and software cache miss handling operations may be performed concurrently in an overlapping manner, such as depicted in FIG. 6A. As shown in FIG. 6A, the software cache hit check operations may overlap with software cache miss handling of other pre-fetch operations. In addition, in some illustrative embodiments, the software cache hit check operations may be allowed to overlap somewhat as well. This allows the pre-fetching of data to be performed more efficiently than known mechanisms in which the software cache accesses are performed sequentially and in association with the use of the data, as depicted in FIG. 6B.

With the above mechanism, however, there are a number of issues that need to be resolved in order to ensure proper operation of the software caching mechanism. A first issue is that, since the second software cache directory access is eliminated by use of the illustrative embodiments, a cache line loaded by the pre-fetch instruction cannot be simply evicted when another software cache miss occurs prior to use of the data. This is because the software cache directory is not re-checked at the later time when the data is actually used and thus, if such an eviction were allowed to happen, the wrong data may be accessed during the subsequent execution of the use instruction.

In order to avoid such a situation, the software cache management engine may implement a Least Recently Used (LRU), First-In-First-Out (FIFO), or Cyclic replacement policy for determining which software cache lines to evict. With a LRU replacement policy, the least recently accessed cache line is selected for eviction by the software cache management engine. With a FIFO replacement policy, the oldest loaded cache line is selected for eviction by the software cache management engine. With a cyclic replacement policy, when the last cache line in the software cache has been evicted and replaced with a new cache line, with the next software cache miss operation, the first cache line in the software cache is selected for eviction. The goal of each of these replacement policies is to cause the software cache management engine to evict a cache line that is not a recently loaded cache line or contains data of a recently executed pre-fetch instruction.

With such a replacement policy in place, e.g., LRU, FIFO, of cyclic replacement policy, at most N concurrent requests are allowed, where N is the set associativity (which is 4 in the depicted examples but may be set to any set associativity that is desired for the system, e.g., 8-way associativity). In other words, in order to ensure that that the N+1 request does not cause one of the cache lines that is the subject of another concurrent request to be evicted, the number of concurrent requests is limited to N. Thus, at most N pre-fetch instructions may be batched together in the executable code by the compiler. Since the geometry of the software cache is under software control, the N value may be modified as needed to increase or decrease parallelism of pre-fetch instructions.

Figure 7:
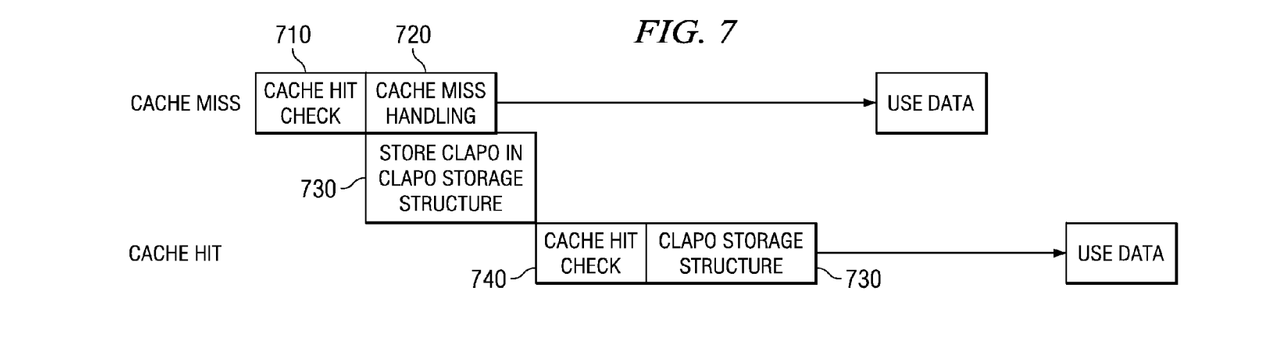
FIG. 7 is an exemplary diagram illustrating a situation in which two or more concurrent pre-fetch instructions for the same cache line may is encountered.

Another issue that needs to be addressed, since batching of pre-fetch instructions is made possible by the mechanisms of the illustrative embodiments, is the possibility that two or more concurrent pre-fetch instructions for the same cache line may be encountered. This situation is depicted in FIG. 7. As shown in FIG. 7, a first pre-fetch instruction causes a first software cache hit check operation 710 to be performed that results in a software cache miss being encountered. The software cache miss is handled 720 as described previously and the resulting cache line address and offset is stored in the CLAPO storage structure 730. During the software cache miss handling 720, a second concurrent pre-fetch instruction is executed thereby causing a second software cache check operation 740 being performed which is directed to the same cache line as the first software cache check operation 710.

In actuality, this is not an issue with the mechanisms of the illustrative embodiments as long as the tests for the completion of a direct memory access (DMA) operation for loading the software cache with the requested data are processed in order or all at once. This is because the tag associated with a cache line is allocated during the software cache hit check of the first software cache hit check operation 710, i.e. the CLAPO is determined during the cache hit check or during an initial operation of the cache miss handler, as described previously. Thus, even though the specific data referenced by the second pre-fetch operation is not yet present in the software cache but is in the process of being loaded into the software cache via a DMA transfer, the second software cache hit check operation 740 will register a software cache hit since the tag is already allocated by the first software cache hit check operation 710. As a result, the cache line address for the cache line is recorded in the CLAPO storage structure 730 for the tag associated with the address that is the subject of the second pre-fetch instruction. Thus, this cache line address may subsequently be used to access the data when executing a subsequent use instruction.

A further issue regarding the mechanisms of the illustrative embodiments is the pre-fetching of a cache line that is in the process of being evicted, i.e. using a DMA operation to write back to shared or global memory a dirty software cache line having data that has been changed. This situation may be addressed by processing the eviction of the dirty cache line in a blocking mode of operation, i.e. no other software cache access operations may be made until the eviction operation is completed. The drawback of this approach to handling this situation is that there cannot be any overlap or parallelism of operations when evicting dirty cache lines.

An alternative solution is, when a concurrent software cache hit check operation is performed, prior to actually performing the software cache hit check operation, the global address corresponding to the evicted software cache line is checked against the global address of the software cache hit check operation to ensure that the global address associated with the concurrent software cache hit check operation does not point to the software cache line being evicted. If the concurrent software cache hit check operation is directed to the same cache line that is being evicted, the software cache hit check operation is blocked until the software cache line eviction operation is completed. Once the software cache line eviction operation completes, the software cache hit check operation may be allowed to resume.

Figure 8:
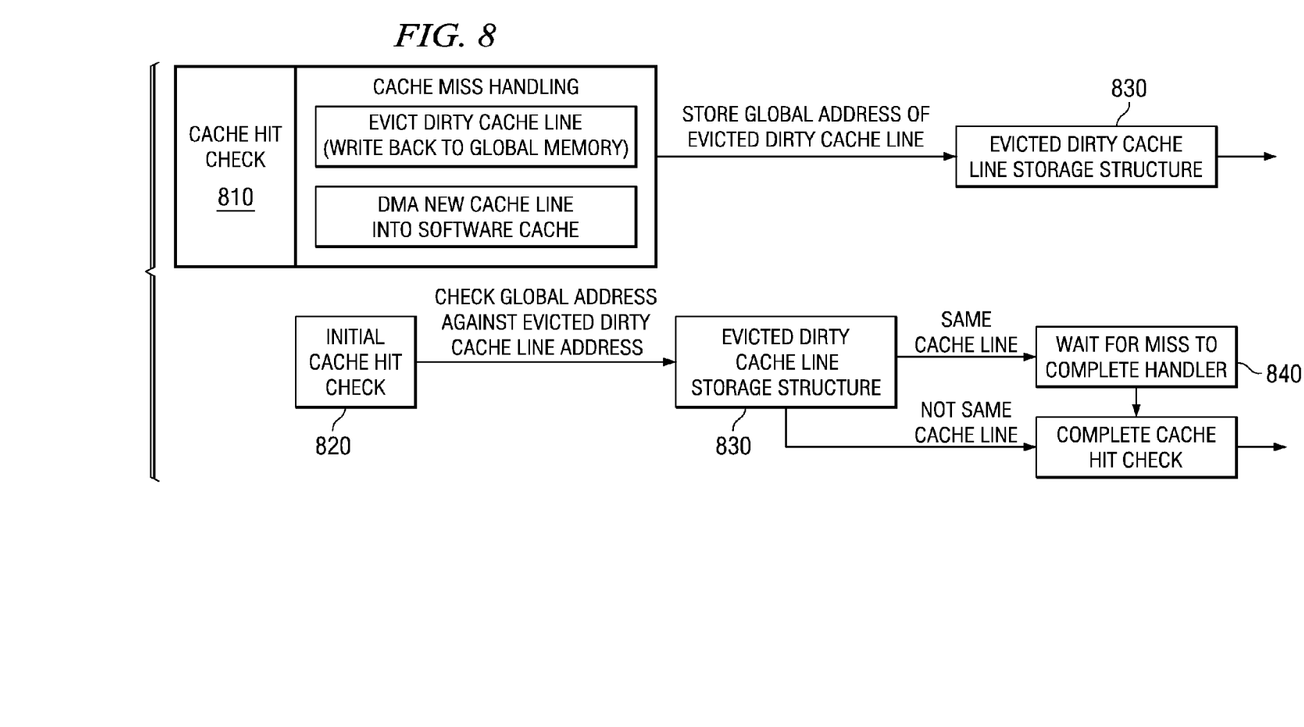
FIG. 8 is an exemplary diagram illustrating a solution for handling a concurrent software cache hit check operation with the eviction of a cache line in accordance with one illustrative embodiment.

This solution is illustrated in FIG. 8. As shown in FIG. 8, during a first software cache hit check 810, a software cache miss occurs and a cache line is selected for eviction which requires that, if the cache line is dirty, the cache line be written back to shared or global memory. The cache line address for the dirty cache line that is being evicted is stored in an evicted dirty cache line storage structure 830, e.g., a dedicated register or known memory location.

As the dirty cache line is being evicted, a second software cache hit check operation 820 is initiated that is directed to the same cache line that is being evicted. Prior to actually performing the software cache hit check operation, or as an initial part of the software cache hit check operation, a check is made of the evicted dirty cache line storage structure 830 to make sure that the cache line referenced as part of the software cache hit check operation is not directed to the same cache line as the evicted dirty cache line corresponding to the stored address. If it is directed to the same evicted dirty cache line, the software cache hit check operation is blocked until the eviction of the dirty cache line is completed and the loading of the new cache line, as part of the miss handling of the first software cache hit check operation, is complete. Thereafter, the second software cache line hit check is allowed to continue with the software cache line hit check resulting in a hit being detected.

As a further issue, it is important to make sure that any DMA commands for loading data into the software cache are completed prior to using the data. When simply batching software cache accesses, one can use a "check completion of all DMA commands associated with the software cache" approach. When this is not available, or the software cache accesses are performed in parallel with the computation in a software pipelined mode of operation, then one may only be able to check for completion of DMA commands just prior to the actual use of the data.

In such a situation, a flag, such as in a register or a well known storage location in the local store, for example, may be used to signal if a previous software cache miss was detected for the data that is the subject of the use instruction. For example, a special flag bit may be set in the register or storage location in which the cache line address is stored to indicate whether the cache line address was stored as a result of a software cache miss being detected.

If the flag bit is set, then the use of the corresponding data may be stalled until the DMA operation for loading the cache line corresponding to the requested data into the software cache is completed. A special "wait for miss to complete" handler routine may be used to perform such waiting and periodic checking for completion of the DMA operation associated with the software cache miss handling.

Figure 9:
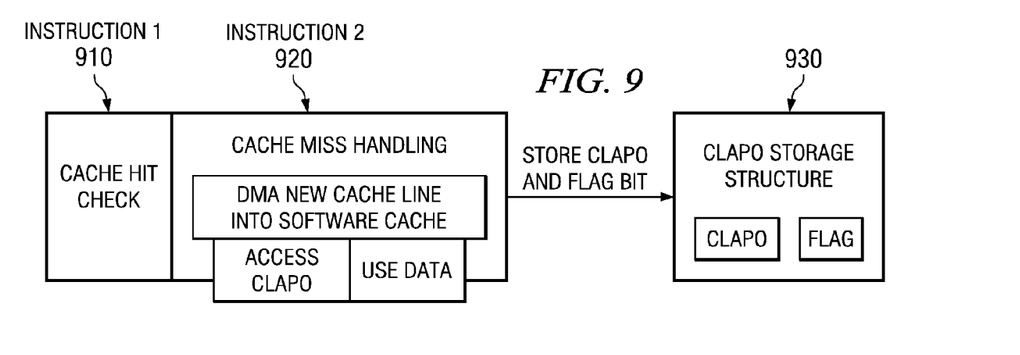
FIG. 9 is an exemplary diagram illustrating a solution to the situation of using data prior to completion of a software cache miss DMA operation in accordance with one illustrative embodiment.

The solution to the situation of using data prior to completion of a software cache miss DMA operation is illustrated in FIG. 9. As shown in FIG. 9, a first software cache hit check operation 910 results in a software cache miss being detected and thus, a software cache miss handler is invoked to evict a cache line and load a new cache line corresponding to the data that is being requested. The loading of the cache line requires a DMA operation from shared or global memory into the software cache of the local store. Initially, however, the cache miss handler allocates the cache line address for the new cache line and stores that cache line address in the CLAPO storage structure 930. In addition, since a software cache miss occurred, the cache miss handler sets a flag bit in the CLAPO storage structure 930 to indicate that the cache line is being loaded as part of a cache miss handling operation.

During the time that the DMA operation is being performed, another instruction 920 may attempt to use data from the cache line that is being DMA'd into the software cache. When software cache management engine accesses the CLAPO storage structure 930 to obtain the address of the cache line corresponding to the data required by the subsequent use instruction 920, the software cache management engine also reads in the flag bit stored in the CLAPO storage structure 930. The software cache management engine determines if the flag bit is set and, if set, jumps to a "wait for miss to complete" handler routine for waiting until after the cache miss DMA operation is completed before allowing the use instruction to execute on the requested data.

Once the cache miss DMA operation is completed, the flag bit in the associated CLAPO storage structure 930 is reset. Thus, when the software cache management engine retrieves the cache line address from the CLA storage structure 930 and the flag bit is not set, the use instruction is allowed to continue unhindered.

It should be noted that, in some implementations of the illustrative embodiments, such as in the CBE 100 in FIG. 1, there are special registers that inform the processors, e.g., the SPEs, of the status of their DMA requests. Thus, there may not be a need in such architectures for additional flags. In such cases, when the DMA completes, the hardware automatically sets at least one bit to a predetermined value to indicate the completion of the DMA requests. Then, before using a value, in one illustrative embodiment, one can simply check the status of this at least one bit to determine if its value indicates the completion of the DMAs generated by the software cache.

Figure 10:
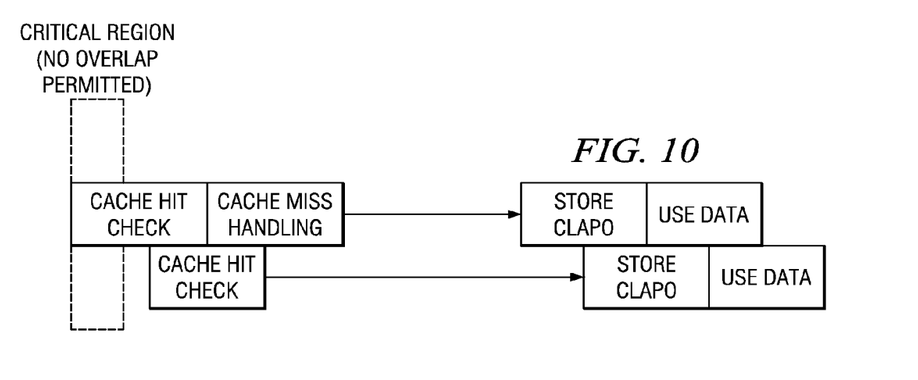
FIG. 10 is an exemplary diagram illustrating scheduling of overlap between software cache access requests in accordance with one illustrative embodiment.

Finally, as shown in FIG. 10, another issue with regard to batching software cache accesses is the scheduling of overlap between software cache access requests. For example, with the mechanisms of the illustrative embodiments, two consecutive software cache access requests may overlap since the software cache hit check operation is simply executable code. Thus, for example, the computation to locate the software cache directory entry of one request can overlap with any part of a previous software cache access request, e.g., the software cache hit check operation or software cache miss handling operation.

However, there is a critical region of the software cache access operation where such overlap cannot be permitted. This critical region includes all updates to the software cache directory, allocation of the software cache line, and other like operations that must be done in an atomic fashion so as to avoid an unstable situation. Thus, it is important that scheduling of software cache access requests be performed in a manner such that this critical region is not overlapped by other software cache access requests.

Figure 11:
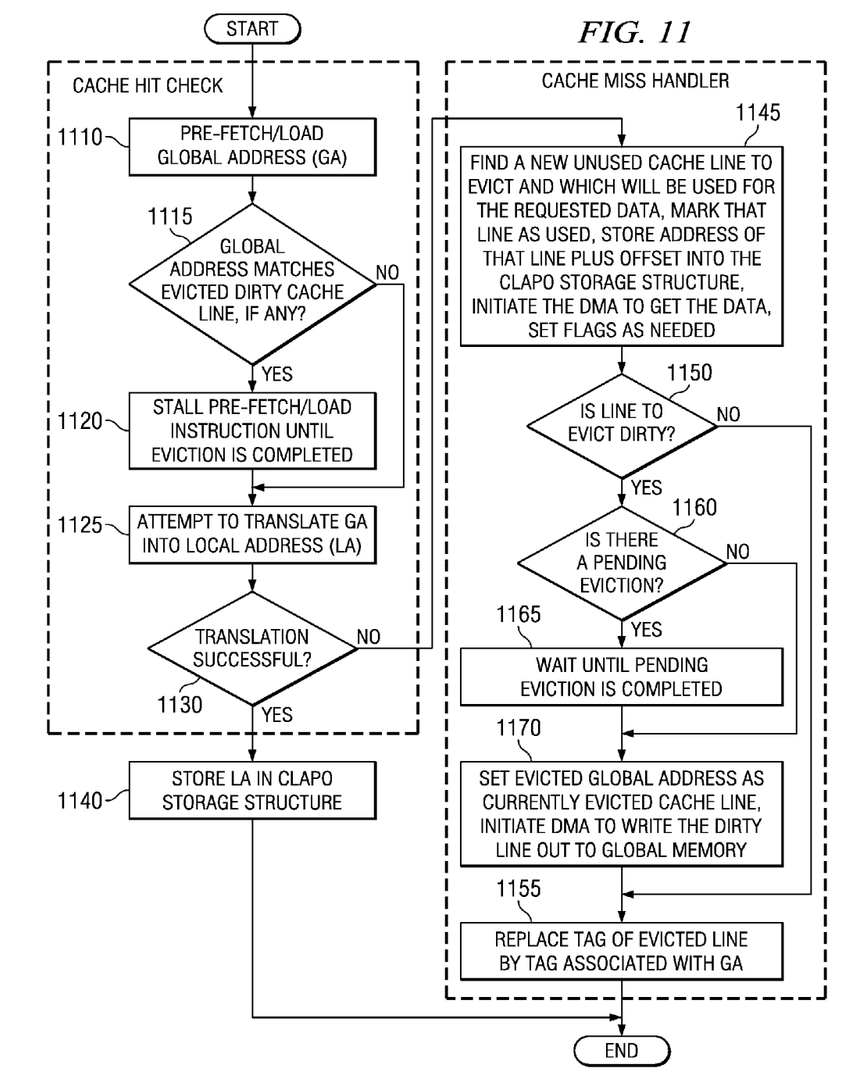
FIG. 11 is a flowchart outlining an exemplary operation for pre-fetching data into a software cache in accordance with one illustrative embodiment.
Figure 12:
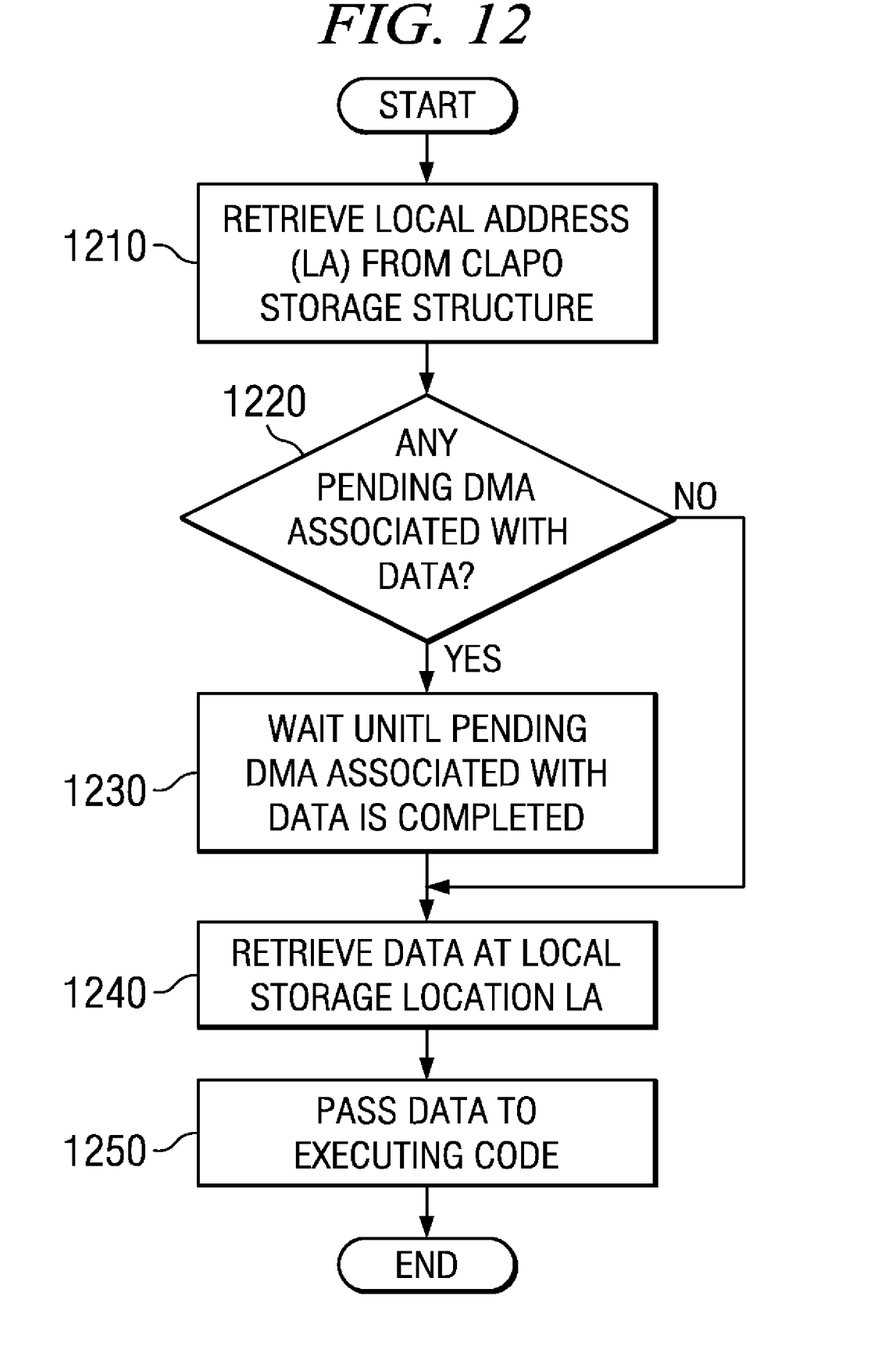
FIG. 12 is a flowchart outlining an exemplary operation for handling a use instruction in accordance with one illustrative embodiment.

FIG. 11 is a flowchart outlining an exemplary operation for pre-fetching data into a software cache in accordance with one illustrative embodiment. FIG. 12 is a flowchart outlining an exemplary operation for handling a use instruction in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 11, the operation starts with a pre-fetch/load of a global address (GA) for a pre-fetch/load instruction executed by a processor (step 1110). A software cache management engine first determines if the global address matches an evicted dirty cache line, if any (step 1115). If the global address matches a global address for a dirty cache line selected for eviction, then the software cache management engine stalls the execution of the pre-fetch/load instruction until the eviction of the dirty cache line is completed (step 1120).

If the global address does not match a dirty cache line selected for eviction, then the software cache management engine attempts to translate the global address into a local address (LA), such as a local address for a local store associated with the processor (step 1125). The software cache management engine determines if the translation is successful (step 1130). If the translation is successful, i.e. a cache hit occurs, then the software cache management engine stores the local address (LA) in the cache line address plus offset (CLAPO) storage structure (step 1140).

If the translation is not successful, a cache miss handler selects a new unused cache line to evict in the software cache, marks the selected cache line as used, stores the address of the cache line plus an offset for the location where the data will be stored in the CLAPO storage structure, initiates a DMA operation to get the data, and sets flags in the software cache as needed (step 1145). The cache miss handler determines if the line selected for eviction is a dirty cache line (step 1150). The cache miss handler replaces the tag of the dirty cache line with the tag associated with the global address (step 1155) and the operation terminates.

If the selected cache line is dirty, the cache miss handler determines if there is a pending eviction of the dirty cache line (step 1160). If there is a pending eviction, the cache miss handler waits for the pending eviction to complete (step 1165). Thereafter, or if there is no pending eviction, the cache miss handler sets the evicted global address as the currently evicted cache line and initiates a DMA operation to write the dirty cache line out to the global memory (step 1170). The operation then continues on to step 1155. It should be noted that an extension of this scheme can tolerate several pending evictions by keeping track of several dirty lines being concurrently evicted.

With reference now to FIG. 12, the handling of a use instruction begins with the software cache management engine retrieving the local address (LA), corresponding to a global address for the data being requested, from a cache line address plus offset (CLAPO) storage structure (step 1210). The software cache management engine then determines whether there are any pending DMA operations associated with the data corresponding to the local address (step 1220). If there are DMA operations pending, the software cache management engine waits until the pending DMA operations have completed (step 1230).

If there are no DMA operations pending on the data, the software cache management engine retrieves the data at the local storage location specified by the local address (step 1240). The data is then passed to the executing code (step 1250) and the operation terminates.

Thus, the illustrative embodiments provide mechanisms for decoupling software cache access and miss handling from actual data use. The mechanisms include elements for storing cache line addresses for pre-fetched data in registers or well known locations of a local store of a processor. The mechanisms further include elements for utilizing these stored cache line addresses to quickly and efficiently access data in a software cache while avoiding duplicative address translation and software cache directory lookup operations. These mechanisms include elements for handling replacement of cache lines, concurrent pre-fetch instructions to the same cache line, pre-fetching of a cache line that is the subject of an eviction operation, making sure that cache line DMA operations are completed before their data can be used, and scheduling overlap between software cache access requests.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for accessing data, comprising:
   receiving a global address for the data as part of a pre-fetch instruction for pre-fetching the data into a software cache data structure stored in a local memory of a processor of the data processing system;
   performing one or more operations to ensure that the data is present in the software cache data structure in response to receiving the global address as part of the pre-fetch instruction;
   storing a local address corresponding to the global address in a cache local address plus offset (CLAPO) storage device associated with the software cache data structure, wherein the local address comprises a pointer to a cache line in the software cache data structure where the data is stored and an offset within the cache line;
   receiving a use instruction for using the data, the use instruction specifying the global address for the data;
   determining if the local address corresponding to the global address specified by the use instruction is present in the CLAPO storage device;
   retrieving the local address from the CLAPO storage device if the local address is present in the CLAPO storage;
   directly accessing the data in the software cache data structure using the local address without performing a software cache hit check operation in response to the local address being retrieved from the CLAPO storage device, wherein the global address is in a global address space of a global storage device associated with the data processing system, and wherein the local address is in a local address space of the local memory associated with the processor of the data processing system.

2. The method of claim 1, wherein the CLAPO storage device is a register associated with the processor.

3. The method of claim 1, wherein the CLAPO storage device is a known location in the local memory associated with the processor.

4. The method of claim 1, wherein the method is implemented using a software cache management engine inserted, by a compiler, into compiled code that is executed by the data processing system.

5. The method of claim 1, wherein the pre-fetch instruction is inserted, by a compiler, into compiled code executed by the processor.

6. The method of claim 1, further comprising performing a software cache hit check operation to obtain the local address, if the local address corresponding to the global address is not present in the CLAPO storage device, wherein performing the software cache hit check operation to obtain the local address, comprises:
   attempting to translate the global address into the local address using a software cache directory data structure;
   determining if the translation is successful; and
   storing the local address in the CLAPO storage device if the translation is successful.

7. The method of claim 6, wherein performing the software cache hit check operation further comprises:
   determining if the global address matches an evicted dirty cache line; and
   stalling accessing of the data by the processor until eviction of the dirty cache line is completed if the global address matches an evicted dirty cache line.

8. The method of claim 6, wherein performing the software cache hit check operation further comprises:
   performing cache miss handling if the translation is unsuccessful.

9. The method of claim 8, wherein performing cache miss handling comprises:
   selecting a software cache line to evict;
   storing a local address corresponding to the selected cache line in the CLAPO storage device; and
   initiating a transfer of the data from the global storage device to the software cache data structure in the local storage device.

10. The method of claim 9, wherein performing cache miss handling further comprises:
    determining if the software cache line to evict is dirty;
    determining if there is a pending eviction of the software cache line if the software cache line is dirty; and
    waiting for the pending eviction of the software cache line to complete if there is a pending eviction of the software cache line.

11. The method of claim 1, wherein the pre-fetch instruction is part of a batch of a plurality of pre-fetch instructions for pre-fetching a plurality of data to be stored in the software cache data structure in the local memory.

12. The method of claim 11, wherein the batch of a plurality of pre-fetch instructions is executed in a disassociated manner from use instructions for using the data pre-fetched by the batch of a plurality of pre-fetch instructions.

13. The method of claim 12, wherein software cache hit check operations and software cache miss handling operations performed in response to executing the batch of a plurality of pre-fetch instructions are performed concurrently in an overlapping manner.

* * * * *